United States Patent [19]
Challey

[11] 3,761,594
[45] Sept. 25, 1973

[54] COMPOSITION FOR CONTROL OF COCCIDIOSIS CONTAINING A COCCIDIOSTIATICALLY ACTIVE 4-HYDROXY-QUINOLINE AND METICLORPINDOL

[75] Inventor: John R. Challey, Ashland, Ohio
[73] Assignee: Rhodia Inc., New York, N.Y.
[22] Filed: Jan. 28, 1971
[21] Appl. No.: 110,767

[52] U.S. Cl.................................. 424/258, 424/263
[51] Int. Cl............................................. A61k 27/00
[58] Field of Search............................ 424/258, 263

[56] References Cited
OTHER PUBLICATIONS
Merck Index–Eighth Edition (1968) pages 174 & 694

Primary Examiner—Sam Rosen
Attorney—Clelle W. Upchurch

[57] ABSTRACT

Coccidiostatic 4-hydroxyquinolines and coccidiostats of the meticlorpindol type are both active by preventing development of the first schizogenous generation of Eimeria in the intestinal mucosa of poultry and act prophylactically in controlling the development of pathogenic species of this organism but, while Eimeria species become resistant to both types of coccidiostats after a period of continued exposure, it has been unexpectedly found that when the species becomes resistant to one type they become more sensitive to the other, and accordingly a mixture of the two has a greater prophylactic effect than either coccidiostat alone and a lower total amount of coccidiostat can be used in preventing further development of the organism. The invention includes a mixture of the two types of coccidiostats in poultry rations and premixes for the preparation of poultry rations and to a method of controlling coccidiosis in poultry by administering a mixture of the two types of coccidiostats in their feed.

7 Claims, No Drawings

COMPOSITION FOR CONTROL OF COCCIDIOSIS CONTAINING A COCCIDIOSTIATICALLY ACTIVE 4-HYDROXY-QUINOLINE AND METICLORPINDOL

This invention relates to compositions of matter for the control of coccidiosis and methods of controlling coccidiosis.

Coccidiosis is a parasitic disease caused by a number of species of coccidia of the genus *Eimeria*. It is an economically serious disease in chickens, although other poultry such as turkeys, geese, ducks, and even mammals, such as cattle and sheep, may be infected. The parasites are host-specific and in most cases involve invasion of the epithelium of the digestive tract. In the case of chickens, there are at least five species of considerable economic importance and several others of lesser importance. The disease is characterized by high mortality, up to 50 percent, poor weight gains, and reduced efficiency of feed conversion. Reduced egg production is also often observed.

The coccidia *Eimeria tenella* infection involves invasion of the ceca, resulting in accumulation of blood in the ceca and the passage of blood in the droppings. *Eimeria necatrix* infections are chiefly observed in the middle or upper third of the small intestine and damage to the bird occurs in the small intestine. *Eimeria brunetti* infections damage the lower intestine. Other important species of Eimeria which infect the intestinal tract are *E. mivati*, *E. maxima* and *E. acervulina*.

The life cycle of Eimeria coccidia is complex, first involving ingestion by the bird of sporulated oocysts. The ingested oocysts excyst under favorable conditions in the digestive system of the birds, releasing sporozoites which lodge in the epithelium of the intestinal mucosa. Within 48 hours after infection, first-generation schizonts are found in the epithelial cells. Later, second-generation schizonts and gametocytes are found and finally oocysts are developed which are eventually excreted.

Because of the economic importance of coccidiosis, much research has been conducted in efforts to control the disease. At least 20 different products have been made available for the prevention and control of coccidiosis in chickens, yet the disease remains one of the most important problems of the poultry industry. Among the various drugs that have been used in the control of coccidiosis are included sulfamethazine, sulfaquinoxaline, nitrophenide, nitrofurazone, nicarbazin, chlortetracycline, phenylarsonic acids, amprolium, and others. At the present time, a number of 4-hydroxyquinolines and meticlorpindol are considered to be the most effective drugs yet developed for the prevention and control of coccidiosis in chickens.

Despite the great amount of research that has been undertaken and the large number and variety of drugs that have been offered for the control of coccidiosis, it has been found that, with few exceptions, these drugs are coccidiostatic and do not kill the infective organism. It appears that in each case they halt the development of the organism through the various stages of its life cycle while in the intestinal tract of the bird and thus prevent the pathological damage which is noted in the infected birds. Long et al., "Eimeria: Effect of Meticlorpindol and Methyl Benzoquate on Endogenous Stages in the Chicken," *Experimental Parasitology*, Volume 23, Number 3, December 1968. It has become apparent, however, in recent studies, that continued treatment of a flock of chickens exposed to infection and reinfection by being confined in contaminated pens and poultry yards invariably results in loss of prophylactic effectiveness of the drug, regardless of the particular drug being used. Apparently, while the drugs are effective in preventing development of the organism through some stage of its life cycle, for example, development of sporozoites into trophozoites, some of the organisms escape from the environment of the prophylactic drug, possibly because of inadequate drug levels or because they are resistant mutants and continue their life cycle and are eventually excreted as oocysts onto the premises in which the birds are confined. Accordingly, after several passages through the intestinal tract, the population of strains of resistant species on the premises is increased proportionately so that, for all practical purposes the ingested coccidia are mostly drug resistant and the prophylactic drug no longer has any effect on the major population of the microorganisms. The drug then appears to have lost its effectiveness at that particular location.

An article in the December, 1968 issue of the *Journal of Parasitology*, Volume 54, No. 6, pages 1190–1193, "Development of Resistance to Quinoline Coccidiostats under Field and Laboratory Conditions" by McManus et al., shows that some of the most effective 4-hydroxyquinoline coccidiostats such as amquinolate, buquinolate, M and B 15,497 and methyl benzoquate became less effective after continued use. Evidence was presented that indicated that all species of coccidia studied acquired a tolerance, or resistance, to the drugs after only 4 to 8 cycles of exposure. It has also been found that the most important pathogenic species of Eimeria also become resistant to meticlorpindol, which is one of the most effective of the non-quinoline type coccidiostats.

The 4-hydroxyquinoline coccidiostats, of which there are many, possess a high degree of activity against a broad spectrum of coccidia species of the genus Eimeria. While the various members of this series differ widely in basic activity, all seem to possess a similar mode of action. This similarity is indicated by the fact that all of the members of the group exert their effect solely upon the coccidian sporozoite preventing the development of the first schizogenous generation. No other stages of the coccidian life cycle are known to be affected by the 4-hydroxyquinolines. The compounds of the group also are similar in that they possess a coccidiostatic rather than a coccidiocidal effect.

Most conclusive evidence for the identity in mode of action between these compounds comes from cross resistance studies. Strains of coccidia made resistant to any one of the 4-hydroxyquinolines become resistant to all members of the group. These observations suggest that although these compounds vary widely in activity ($ED_{50}$) that they all act upon the same metabolic pathway.

Meticlorpindol (3,5-dichloro-2,6-dimethyl-4-pyridinol), while structurally not closely related, bears certain relationship to the 4-hydroxyquinolines in its anticoccidial effect. It exerts a static effect upon the sporozoite stage of the coccidian life cycle. As with the 4-hydroxyquinolines, activity against other stages has not been observed.

Strong evidence for a close relationship in mode of coccidiostatic action has come from the study of drug fast strains. In studies which I have made of field strains isolated from commercial broiler flocks with histories of medication with buquinolate or meticlorpindol, I found strains resistant to both compounds but I found no evidence of cross resistance between the two compounds. Buquinolate and decoquinate had good activity against strains resistant to meticlorpindol. Strains resistant to the 4-hydroxyquinolines were not resistant to meticlorpindol. I further observed that isolates with a history of medication with buquinolate followed by medication with meticlorpindol tended to be resistant to the latter, but sensitive to buquinolate and decoquinate. Evaluation of the data from several hundred field collections revealed that those strains resistant to meticlorpindol tend to be particularly well controlled by 4-hydroxyquinolines and conversely that those strains showing resistance to 4-hydroxyquinolines were particularly sensitive to meticlorpindol. An extensive study of all commercially important coccidiostats and several other compounds presently under development suggests that sensitivity to these is independent of sensitivity to the 4-hydroxyquinolines and/or meticlorpindol. In other words, drugs that are cocciodiostatic to a particular species of Eimeria are effective to the same degree on the same species, even though strains of that species are resistant to the 4-hydroxyquinolines or meticlorpindol.

In other studies, a culture of E. acervulina was isolated from a flock of chickens under medication with buquinolate. This strain was resistant to both buquinolate and decoquinate, but had never been exposed to meticlorpindol and was highly sensitive to that coccidiostat. A subline of this strain was carried through 8 passages in chickens in the presence of meticlorpindol to develop resistance to that coccidiostat. The parent strain was designated F-56-R and the resistant substrain F-56-R-CR. An unrelated strain of E. acervulina, designated Ea-H and C, which had been maintained in applicant's laboratories for many years and being known to be sensitive to all commercially important coccidiostats was also obtained. The effect of decoquinate (ethyl-6-n-decyloxy-7-ethoxy-4-hydroxyquinoline-3-carboxylate) upon oocyst production in chicks by these three strains was determined at various drug levels. Medicated mash carrying various amounts of the drug and a non-medicated mash as a control were fed to 16-day-old chickens which were housed in separate pens in groups of ten. 24 Hours after initiating the experiment, each bird was inoculated with 2 million infective Eimeria acervulina oocysts of one of the three strains indicated above. The total oocysts produced per bird was determined in their droppings during a period of 96 to 240 hours after administration of the infective oocysts. The results of this experiment are shown in the following table.

TABLE I

Effect of Decoquinate Upon Oocyst Production of F-56-R and F-56-R-CR

| Drug Level (%) | Oocyst Production* Total Produced/Bird (in millions) | | |
|---|---|---|---|
| | H&C-Ea | F-56-R | F-56-R-CR |
| 0.012 | 9.5 | 98.4 | 2.0 |
| 0.006 | 45.5 | 58.1 | 5.2 |
| 0.003 | 91.1 | 123.1 | 51.8 |
| 0.0015 | 79.3 | 108.2 | 82.8 |
| 0.00075 | 161.3 | 41.0 | 208.5 |
| 0.00037 | 111.3 | 95.6 | 176.7 |
| Nonmedicated | 111.3 | 61.3 | 135.9 |

* Oocyst Production 96–240 hr. postinoculation

As will be noted, the birds which were inoculated with the strain F-56-R showed the expected resistance to decoquinate but, in marked contrast thereto, the birds inoculated with the meticlorpindol-resistant strain F-56-R-CR were highly sensitive to decoquinate. It is also apparent that the meticlorpindol-sensitive organisms were more sensitive to decoquinate than the normal drug-sensitive control strain Ea-H and C.

Further evidence of the interrelationship between sensitivity to meticlorpindol and the 4-hydroxyquinolines was observed in a study in which the effect of decoquinate on a normal drug-sensitive strain of E. acervulina and a meticlorpindol-resistant strain derived from this strain was compared with the effect of meticlorpindol on each of these same two strains under identical conditions at different drug levels in the feed. The results of this experiment are shown in the following table.

TABLE II

The Effect of Selection for Resistance to Meticlorpindol upon Sensitivity to Decoquinate and Meticlorpindol - Total Oocysts Produced 96–240 Hours (in millions/bird)

| Drug Level (%) | Decoquinate | | Meticlorpindol | |
|---|---|---|---|---|
| | H&C-Ea | H&C-Ea-CR | H&C-Ea | H&C-Ea-CR |
| 0.048 | | | 4.8 | 72.0 |
| 0.024 | | | 25.2 | 51.9 |
| 0.012 | 16.0 | 1.1 | 157.2 | 87.1 |
| 0.006 | 67.1 | 2.2 | 119.7 | 53.6 |
| 0.003 | 70.8 | 18.6 | 123.8 | 97.9 |
| 0.0015 | 245.4 | 57.4 | 52.1 | 60.3 |
| 0.00075 | 180.2 | 216.3 | | |
| 0.000375 | 125.1 | 105.1 | | |
| Nonmedicated | 65.0 | 96.4 | | |

It will be seen from the results shown above that the meticlorpindol-sensitive strain was much more sensitive to decoquinate than was the normal strain Ea-H and C since, for example, the average bird excreted only 1.1 million Ea-H and C oocysts per bird during the experiment while the normal drug-sensitive strain excreted 16 million oocysts per bird at a drug level of 0.012 percent by weight. The results also show the expected activity of meticlorpindol on the normal drug-sensitive coccidia and the expected reduced activity against the meticlorpindol-resistant strain.

The foregoing experiments led to the belief that combinations of a 4-hydroxyquinoline coccidiostat with a coccidiostat of the meticlorpindol type might have synergistic activity in suppressing coccidiosis caused by pathogenic species of Eimeria. The following examples illustrate the fact that this is true.

EXAMPLE 1

Methyl-6-n-decyloxy-4-hydroxy-7-isopropoxy-quinoline-3-carboxylate (U. S. Pat. No. 3,485,845 — M and B 15,584) and 3,5-dichloro-2,6-dimethylpyridinol (meticlorpindol, U. S. Pat. No. 3,206,358) were dispersed singly and in various combinations in a standard poultry mash to produce medicated rations. Portions of these rations and the non-medicated mash were fed as the sole source of food to groups of ten 16-day-old chickens which were housed in separate pens according to the ration being fed. 24 Hours after initiating the feeding an inoculum containing 1,000,000 infective Eimeria acervulina oocysts of a strain which was sensitive to both 4-hydroxyquinolines and meticlorpindol were instilled into the crop of each chicken. During the period 96 tp 240 hours after administration of the infective dose the feces from each group of chickens were collected and counts were made in order to determine the number of oocysts produced as a result of the inoculation with infective oocysts. These counts gave an accurate measure of the effectiveness of each of the compounds, singly and in combination, in controlling the multiplication of the coccidial organisms within the chicken.

| Methyl-6-n-decyloxy-4-hydroxy-7-isopropoxy quinoline-3-carboxylate percent in Ration | Oocyst counts [expressed as oocysts produced (in millions) per chicken 96 to 240 hours after inoculation] | | | | | |
|---|---|---|---|---|---|---|
| | Meticlorpindol in ration— | | | | | |
| | None | 0.002% | 0.004% | 0.008% | 0.016% | 0.032% |
| None | 126.7 | 151.7 | 83.7 | 126.5 | 88.6 | 34.0 |
| 0.0001 | 246.6 | 47.2 | 13.6 | 1.4 | [1] ND | ND |
| 0.0002 | 104.6 | 16.2 | 23.0 | .7 | ND | ND |
| 0.0004 | 29.0 | 6.6 | .4 | .2 | ND | ND |
| 0.0008 | 6.5 | ND | ND | ND | ND | ND |
| 0.0016 | 1.8 | ND | ND | ND | ND | ND |

[1] Combination not done.

EXAMPLE 2

Ethyl-6-n-decyloxy-7-ethoxy-4-hydroxyquinoline-3-carboxylate (decoquinate, U. S. Pat. No. 3,485,845) and 3,5-dichloro-2,6-dimethylpyridinol were dispersed singly and in combination in a standard poultry mash. The anticoccidial activity against *Eimeria acervulina* in chickens was determined in a manner identical to that employed in Example 1.

| Decoquinate percent in ration | Oocyst counts [expressed as oocyst produced (in millions) per chicken 96 to 240 hours after inoculation] | | | | | |
|---|---|---|---|---|---|---|
| | Meticlorpindol in ration— | | | | | |
| | None | 0.0015% | 0.003% | 0.006% | 0.012% | 0.024% |
| None | 92.2 | 131.4 | 92.5 | 113.6 | 156.9 | 51.3 |
| 0.0015 | 175.6 | 64.9 | [1] ND | ND | ND | ND |
| 0.0030 | 166.0 | ND | 5.9 | ND | ND | ND |
| 0.0060 | 58.6 | ND | ND | 0.15 | ND | ND |
| 0.0120 | 16.2 | ND | ND | ND | 0.18 | ND |
| 0.0240 | 12.2 | ND | ND | ND | ND | ND |

[1] Combination not done.

EXAMPLE 3

Ethyl-4-hydroxy-6,7-diisobutoxy-3-quinolinecarboxylate (buquinolate — U. S. Pat. No. 3,267,106) and 3,5-dichloro-2,6-dimethylpyridinol were dispersed singly and in combination in a standard poultry mash. The anticoccidial activity of the medicated rations against *Eimeria acervulina* in the chicken was determined in a manner identical to that employed in Example 1.

| Buquinolate percent in ration | Oocyst counts [expressed as oocysts produced (in millions) per chicken 96 to 240 hours after inoculation] | | | | | |
|---|---|---|---|---|---|---|
| | Meticlorpindol in ration— | | | | | |
| | None | 0.002% | 0.004% | 0.008% | 0.016% | 0.032% | 0.064% |
| None | 157 | 158 | 154 | 149 | 84 | 4.3 | 5.9 |
| 0.002 | 108 | 120 | 71.3 | 7.1 | [1] ND | ND | ND |
| 0.004 | 149 | 85.8 | 16.0 | 1.2 | ND | ND | ND |
| 0.008 | 138 | 24.5 | 1.4 | .9 | ND | ND | ND |
| 0.016 | 149 | ND | ND | ND | ND | ND | ND |
| 0.032 | 86 | ND | ND | ND | ND | ND | ND |
| 0.064 | 27 | ND | ND | ND | ND | ND | ND |

[1] Combination not done.

EXAMPLE 4

Methyl-7-diethylamino-4-hydroxy-6-n-propylquinoline-3-carboxylate (amquinolate — U. S. Pat. No. 3,377,352) and 3,5-dichloro-2,6-dimethylpyridinol were dispersed singly and in combination in a standard poultry mash. The anticoccidial activity against *Eimeria acervulina* in chickens was determined in a manner identical to that employed in Example 1.

| Amquinolate percent in feed | Oocyst counts [expressed as oocysts produced (in millions) per chicken 96 to 240 hours after inoculation] | | | | | |
|---|---|---|---|---|---|---|
| | Meticlorpindol in ration— | | | | | |
| | None | 0.001% | 0.002% | 0.004% | 0.008% | 0.016% | 0.032% |
| None | 117.3 | 153.2 | 143.8 | 133.9 | 138.7 | 31.4 | 3.0 |
| 0.001 | 153.4 | 88.2 | 66.3 | 16.2 | [1] ND | ND | ND |
| 0.002 | 152.3 | 46.5 | 29.3 | 3.0 | ND | ND | ND |
| 0.004 | 126.8 | 4.2 | 3.7 | 0.6 | ND | ND | ND |
| 0.008 | 20.0 | ND | ND | ND | ND | ND | ND |
| 0.016 | 7.8 | ND | ND | ND | ND | ND | ND |
| 0.032 | 0.5 | ND | ND | ND | ND | ND | ND |

[1] Combination not done.

EXAMPLE 5

Ethyl-6,7-biscyclopropylmethoxy-1,4-dihydro-4-oxo-3-quinoline carboxylate and 3,5-dichloro-2,6-dimethylpyridinol were dispersed singly at 0.003 and 0.009 percent in feeds. They were also mixed in a combination containing 0.003 percent of each. The anticoccidial activity of the feeds against *Eimeria acervulina* was determined in a manner identical to that employed in Example 1.

| Compound | % in Feed | Total oocysts Produced 96 to 240 Hours |
|---|---|---|
| Control | None | 251.8 |
| Ethyl-6,7-biscyclopropyl-methoxy 1,4-dihydro-4-oxo-3-quinoline carboxylate | 0.003% | 139.5 |
| Ethyl-6,7-biscyclopropyl-methoxy 1,4-dihydro-4-oxo-3-quinoline carboxylate | 0.009% | 106.4 |
| 3,5-dichloro-2,6-dimethyl-pyridinol | 0.003% | 123.9 |
| 3,5-dichloro-2,6-dimethyl-pyridinol | 0.009% | 29.2 |
| Ethyl-6,7-biscyclopropyl-methoxy 1,4-dihydro-4-oxo-3-quinoline carboxylate Plus 3,5-dichloro-2,6-dimethyl-pyridinol | 0.003% + 0.003% | 27.6 |

EXAMPLE 6

Methyl-7-benzyloxy-6-butyl-1,4-dihydro-4-oxoquinoline-3-carboxylate and 3,5-dichloro-2,6-dimethylpyridinol were dispersed singly at 0.003 and 0.009 percent in feeds. They were also mixed in a combination containing 0.003 percent of each. The anticoccidial activity of the feeds against *Eimeria acervulina* was determined in a manner identical to that employed in Example 1.

| Compound | % in Feed | total oocysts Produced 96 to 240 hours |
|---|---|---|
| Control | None | 251.8 |
| Methyl-7-benzyloxy-6-butyl-1,4-dihydro-4-oxoquinoline-3-carboxylate | 0.003% | |
| Methyl-7-benzyloxy-6-butyl-1,4-dihydro-4-oxoquinoline-3-carboxylate | 0.009% | 154.5 |
| 3,5-dichloro-2,6-dimethyl-pyridinol | 0.003% | 123.9 |
| 3,5-dichloro-2,6-dimethyl-pyridinol | 0.009% | 29.2 |
| Methyl-7-benzyloxy-6-butyl-1,4-dihydro-4-oxoquinoline-3-carboxylate Plus 3,5-dichloro-2,6-dimethyl-pyridinol | 0.003% + 0.003% | 4.5 |

As will be apparent from the foregoing examples, a mixture of a coccidiostatically active 4-hydroxyquinoline and a coccidiostat of the meticlorpindol type has a synergistic effect. In other words, mixtures of the two different types of coccidiostats are much more effective than either of the coccidiostats alone at the same level in the ration. Also, the same effect can be obtained with a much lower concentration of total coccidiostat. For example, 0.002 percent amquinolate and 0.004 percent meticlorpindol or a total of 0.006 percent of drug will give the same protective effect as 0.032 percent of meticlorpindol or 0.02 percent amquinolate when used alone. Accordingly, the present invention comprises the use of compounds of the meticlorpindol type (U. S. Pat. No. 3,206,358) together with hydroxyquinoline coccidiostats such as decoquinate and M and B 15,584 (U. S. Pat. No. 3,485,845), buquinolate (U. S. Pat. No. 3,267,106), methylbenzoquate (U. S. Pat. No. 3,414,576), amquinolate (U. S. Pat. No. 3,377,352), cyproquinate, ICI 55,052 (U. S. Pat. No. 3,414,576), and others such as are covered by U. S. Pat. Nos. 3,399,203, 3,448,193 and 3,316,147.

The coccidiostatic hydroxyquinolines are characterized by the general formula

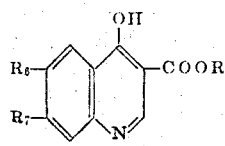

in which R is lower alkyl, $R_6$ is H or alkoxy of 1 to 10 carbon atoms, lower alkyl, lower alkenyl, diloweralkylamino, or cyclopropylmethoxy, $R_7$ is lower alkoxy, lower alkyl benzoxy, chlorbenzoxy, diloweralkylamino or cyclopropylmethoxy. The compounds of the meticlorpindol type that can be used in practicing the present invention are described in U. S. Pat. No. 3,206,358 as 3,5-dihalo-2,6-di(lower alkyl)-4-pyridinols and their lower alkanoic acid esters and their alkali metal, ammonium and mineral acid salts.

A preferred method of practicing the present invention is to incorporate a mixture of a coccidiostatically active 4-hydroxyquinoline and a coccidiostat of the meticlorpindol type in the rations offered to poultry. The usual recommended coccidiostatic level of the 4-hydroxyquinolines varies substantially from one 4-hydroxyquinoline to another, as will be noted in the examples, but in the case of decoquinate, for example, the recommended prophylactic level for the drug when used alone is 0.003 percent by weight in the normal diet. In the case of meticlorpindol, the recommended dosage is 0.015 percent by weight in their diet. Since the invention involves a synergistic effect, the drugs may be used together in the poultry diet in levels less than their recommended dosage. As seen from the tables, doses of 4-hydroxyquinoline, for example, M and B 15,584, are effective in dosages as low as 0.0001 percent when used with 0.002 percent meticlorpindol. Dosages as low as 0.0004 percent of M and B 15,584 with 0.008 percent meticlorpindol almost completely control the development of the sporozoites. With less effective 4-hydroxyquinolines, a larger amount should be incorporated in their diet. Accordingly, the invention contemplates the use of a mixture of a coccidiostatically active 4-hydroxyquinoline and a meticlorpindol type coccidiostat in the diet of the poultry in amounts less than that which would be effective when used alone.

Normally, the mixture of drugs will be first prepared in a concentrated premix of any desired concentration, but so constituted as to make it easier to incorporate the mixture in the poultry rations than would be the case if an attempt was made to mix two relatively pure chemical substances therein. The relative proportion of the 4-hydroxyquinoline and the meticlorpindol will also vary depending upon the effectiveness of the particular 4-hydroxyquinoline that is used in the mixture, but in the case of decoquinate as the 4-hydroxyquinoline coccidiostat, for example, the relative proportions of it and meticlorpindol are substantially equal. In the case of the more active coccidiostat such as M and B 15,584, the mixture might contain 10 times as much meticlorpindol as M and B 15,584.

The premix may contain a relatively high concentration of the drug, for example, 5 to 50 percent by weight with the remainder being a non-toxic ingestible material such as degerminated corn meal, soybean meal, vegetable oils, ground oyster shells, vitamins, lecithin and other elements of poultry sustenance.

Inasmuch as the baby chicks normally become infected as soon as they commence to move about and eat off the floor, they become quickly infected with pathogenic species of Eimeria and therefore the medicated feed of the present invention should be offered to them as soon as possible and should be continued up to marketing. The medicated feeds of the present invention do not have any detrimental effects on the chickens, but rather tend to improve their weight gains and utilization of feed.

What is claimed is:

1. A composition of matter for the control of coccidiosis in animals which comprises a poultry feed having uniformly mixed therewith from 0.0005 to 0.064 percent of meticlorpindol and from 0.0005 to 0.064 percent of methyl-6-n-decyloxy-4-hydroxy-7-isopropoxy-quinoline-3-carboxylate, decoquinate, buquinolate, amquinolate, methyl benzoquate or cyproquinate.

2. A composition of matter in accordance with claim 1 in which the poultry feed contains 0.0005 to 0.064 percent of methyl-6-n-decyloxy-4-hydroxy-7-isopropoxy-quinoline-3-carboxylate and 0.0005 to 0.064 percent of meticlorpindol.

3. A composition of matter in accordance with claim 1 in which the poultry feed contains 0.0005 to 0.064 percent of decoquinate and 0.0005 to 0.064 percent of meticlorpindol.

4. A composition of matter in accordance with claim 1 in which the poultry feed contains 0.0005 to 0.064 percent of buquinolate and 0.0005 to 0.064 percent of meticlorpindol.

5. A composition of matter in accordance with claim 1 in which the poultry feed contains 0.0005 to 0.064 percent of amquinolate and 0.0005 to 0.064 percent of meticlorpindol.

6. A composition of matter in accordance with claim 1 in which the poultry feed contains 0.0005 to 0.064 percent of methyl benzoquate and 0.0005 to 0.064 percent of meticlorpindol.

7. A composition of matter in accordance with claim 1 in which the poultry feed contains 0.0005 to 0.064 percent of cyproquinate and 0.0005 to 0.064 percent of meticlorpindol.

* * * * *